United States Patent [19]

Tanaka et al.

[11] Patent Number: 6,069,191

[45] Date of Patent: *May 30, 2000

[54] AQUEOUS RESIN DISPERSION AND PROCESS FOR THE PREPARATION THEREOF

[75] Inventors: Hisakazu Tanaka; Yasuyuki Suzuki, both of Osaka, Japan

[73] Assignee: Dainippon Ink and Chemicals, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/863,074

[22] Filed: May 23, 1997

[30] Foreign Application Priority Data

May 29, 1996 [JP] Japan ..................................... 8-134933

[51] Int. Cl.$^7$ ..................................................... C08L 83/00
[52] U.S. Cl. ......................... 523/201; 524/457; 524/507; 524/520; 524/544
[58] Field of Search ..................................... 524/507, 520, 524/544, 457; 523/201

[56] References Cited

U.S. PATENT DOCUMENTS 5,112,930  5/1992  Ludemann et al. ..................... 525/440
5,350,795  9/1994  Smith et al. ............................. 524/507

FOREIGN PATENT DOCUMENTS

| 2 0 325 918 | 8/1989 | European Pat. Off. . |
| 61-28527 | 2/1986 | Japan . |
| 61-228078 | 10/1986 | Japan . |
| 1-225618 | 9/1989 | Japan . |
| 1-318027 | 12/1989 | Japan . |
| 5-25239 | 2/1993 | Japan . |

*Primary Examiner*—Bernard Lipman
*Attorney, Agent, or Firm*—Armstrong, Westerman, Hattori, McLeland & Naughton

[57] ABSTRACT

The present invention concerns an aqueous resin dispersion comprising a copolymer of a perfluoroalkyl group-containing ethylenically unsaturated monomer and/or polydimethylsiloxane group-containing ethylenically unsaturated monomer and another ethylenically unsaturated monomer copolymerizable therewith dispersed in water in the presence of a water-dispersible polyurethane containing a polydimethylsiloxane group such as silicone and a hydrophilic group such as a carboxylate group. The aqueous resin dispersion of the present invention provides a release agent which can freely control releasability, be excellent in adhesion to a substrate, and undergo little migration to back face or little change in releasability with time.

14 Claims, No Drawings

AQUEOUS RESIN DISPERSION AND PROCESS FOR THE PREPARATION THEREOF

FIELD OF THE INVENTION

The present invention relates to an aqueous dispersion of a perfluoroalkyl group and a polydimethylsiloxane group-containing resin and a process for the preparation thereof. The aqueous dispersion of a perfluoroalkyl group and a polydimethylsiloxane group-containing resin according to the present invention can be used as a release agent.

BACKGROUND OF THE INVENTION

As release agents for pressure sensitive adhesive or release coats for back face of pressure sensitive adhesive tape there have heretofore been used many types of silicone release agents. These silicone-based release agents can be roughly divided into two groups, i.e., condensation or addition type silicone which undergoes ultraviolet curing, EB curing or hot curing to cause condensation reaction or addition reaction on the surface of a substrate and copolymer comprising as a constituent a reactive functional group-containing silicone.

The condensation type silicone can be obtained by the reaction of a dimethyl polysiloxane terminated by silanol functional group at both ends thereof with methyl hydrogen polysiloxane in the presence of a catalyst. The addition type silicone can be obtained by the reaction of a polysiloxane containing a vinyl group at both ends thereof or in its side chains with methyl hydrogen polysiloxane in the presence of a catalyst. These condensation or addition type release agents can be divided into three groups, i.e., solvent type, aqueous type and solvent-free type. These release agents undergo ultraviolet curing, EB curing or hot curing on the surface of a substrate.

Referring to the copolymer comprising as a constituent a reactive functional group-containing silicone, as solvent type materials there have been used compositions comprising as a main component a copolymer of a polyfluoroalkyl vinyl monomer, a silicone vinyl monomer and a copolymerizable vinyl monomer in the presence of a radical apolymerization initiator (JP-A-61-228078 (The term "JP-A" as used herein means an "unexamined published Japanese patent application")). As aqueous type materials comprising similar vinyl copolymers there have been known emulsions comprising as a constituent a silicone-based macromonomer (JP-A-1-318027). Further, block copolymers obtained by the reaction of three components, i.e., an organopolysiloxane containing an alkoxy group, a hydrophilic polyol and a diisocyanate (JP-A-61-28527), aqueous polyurethanes comprising as constituents a polysiloxanediol, an acid diol and other polyols and polyisocyanates (JP-A-5-25239), and modified aqueous polyurethanes containing a perfluoroaliphatic group (JP-A-1-225618).

As mentioned above, silicone release agents or release coats for back face of pressure sensitive adhesive tape exhibit excellent properties such as low releasability and thus have found wide application. However, these release agents leave something to be desired in many respects.

In other words, regardless of whether it is of condensation type, addition type or of the type of copolymer comprising as a constituent a reactive functional group-containing silicone, the solvent in the solvent type silicone release agents raise problems of air pollution, necessity for the improvement of working atmosphere, safety, etc.

Further, the silicone release agents have been found disadvantageous in the art of electronic parts in that silicone migrates to the back face of the tape, deteriorating the adhesivity.

Moreover, the aqueous condensation or addition type release agents which undergo ultraviolet curing, EB curing or hot curing to cause condensation reaction or addition reaction on the surface of a substrate are disadvantageous in that curing cannot proceed completely, resulting in remarkable migration.

The copolymer comprising as a constituent a reactive functional group-containing silicone must be well-balanced between releasability and adhesivity to the surface of a substrate.

Both the silicone polymer-containing emulsion comprising as a main component a copolymer of a polyfluoroalkylvinyl monomer, a silicone-based vinyl monomer and a copolymerizable vinyl monomer in the presence of a radical polymerization initiator and the aqueous polyurethane resin comprising as constituents a polysiloxanediol, an acid diol and other polyols and polyisocyanates are balanced between releasability and adhesivity by properly changing the composition ratio of copolymers. Therefore, in order to control releasability, it is necessary to increase the content of silicone macromonomers. Thus, the control over releasability is limited.

It has been desired to develop a low releasability release agent, a high releasability release agent and a middle releasability release agent. Thus, a technique for freely controlling releasability has been desired. Further, it is necessary to develop an aqueous release agent which undergoes little migration to back face or little change with time.

SUMMARY OF THE INVENTION

The inventors made extensive studies of the solution to the foregoing difficulties. As a result, it has been found that the use of an aqueous resin dispersion comprising a copolymer of a perfluoroalkyl group-containing ethylenically unsaturated monomer and/or polydimethylsiloxane group-containing ethylenically unsaturated monomer and ethylenically unsaturated monomers copolymerizable therewith dispersed in water in the presence of a water-dispersible polyurethane containing a polydimethylsiloxane group and a hydrophilic group makes it possible to provide a low releasability, a high releasability and a releasability on any level in between the above two extreme levels. Thus, the present invention has been worked out.

It is therefore an object of the present invention to provide an aqueous resin dispersion comprising a copolymer of a perfluoroalkyl group-containing ethylenically unsaturated monomer and/or polydimethylsiloxane group-containing ethylenically unsaturated monomer and another ethylenically unsaturated monomer copolymerizable therewith dispersed in water in the presence of a water-dispersible polyurethane containing a polydimethylsiloxane group and a hydrophilic group, preferably a water-dispersible polyurethane containing a polydimethylsiloxane group and a hydrophilic group wherein the hydrophilic group is a carboxylate group and a process for the preparation thereof.

It is another object of the present invention to provide an aqueous resin dispersion defined above wherein the content of the perfluoroalkyl group-containing ethylenically unsaturated monomer is from 40 to 95 parts by weight based on 100 parts by weight of the total weight of the ethylenically unsaturated monomers and preferably wherein the content of the polydimethylsiloxane group-containing ethylenically unsaturated monomer is not more than 30 parts by weight based on 100 parts by weight of the total weight of the ethylenically unsaturated monomers.

These and other objects of the present invention will become more apparent from the following detailed description and examples.

DETAILED DESCRIPTION OF THE INVENTION

The water-dispersible polyurethane containing a polydimethylsiloxane group and a hydrophilic group of the present invention is not specifically limited so far as it has a polydimethylsiloxane group and a hydrophilic group in its molecule. Examples of such a water-dispersible polyurethane include those obtained by the reaction of a polysiloxane having one or more hydroxyl groups per molecule, a compound having at least one active hydrogen atom per molecule and a hydrophilic group, other active hydrogen-containing compounds and a polyisocyanate.

Examples of the polysiloxane containing one or more hydroxyl groups per molecule include compounds listed below.

S-1:
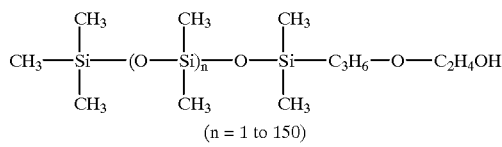
(n = 1 to 150)

S-2:
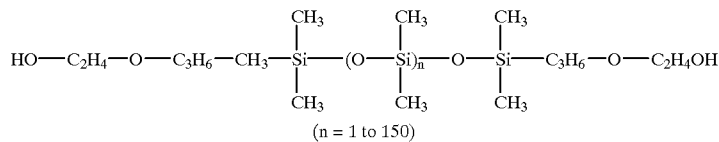
(n = 1 to 150)

S-3:
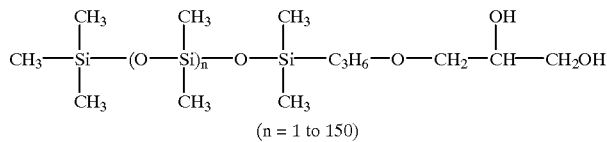
(n = 1 to 150)

S-4:
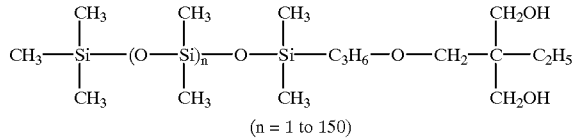
(n = 1 to 150)

group. The content of such a hydrophilic group is not specifically limited but is preferably from 0.5 to 5 parts by weight based on 100 parts by weight of the finally obtained water-dispersible polyurethane. If the content of such a hydrophilic group falls below 0.5 part by weight, a stable aqueous dispersion of a water-dispersible polyurethane, a perfluoroalkyl group-containing ethylenically unsaturated monomer and a monomer copolymerizable therewith cannot be obtained. On the contrary, if the content of such a hydrophilic group exceeds 5 parts by weight, the resulting aqueous dispersion exhibits too extremely great a viscosity to handle.

Other examples of the active hydrogen-containing compound include polyester polyol, polyether polyol, polycarbonate polyol, polyacetal polyol, polyacrylate polyol, polyesteramide polyol, and polythioether polyol.

Specific examples of the compound having one or more active hydrogen atoms per molecule and a hydrophilic group include sulfonic acid-containing compounds such as 2-oxyethane sulfonic acid, phenolsulfonic acid, sulfobenzoic acid, sulfosuccinic acid, 5-sulfoisophthalic acid, sulfanilic acid, 1,3-phenylenediamine-4,6-disulfonic acid and 2,4-diaminotoluene-5-sulfonic acid, derivatives thereof, polyester polyols obtained by the copolymerization thereof, carboxylic acid-containing compounds such as 2,2-dimethylolpropionic acid, 2,2-dimethylolbutyric acid, 2,2-dimethylolvaleric acid, dioxymaleic acid, 2,6-dioxybenzoic acid and 3,4-diaminobenzoic acid, derivatives thereof, and polyester polyols obtained by the copolymerization thereof. These hydrophilic group-containing diols may be used, singly or in combination.

Examples of the hydrophilic group to be contained in these compounds include ionic groups such as carboxylate group and sulfonate group as in the foregoing compound having one or more active hydrogen atoms per molecule and a hydrophilic group. Other examples of the hydrophilic group include nonionic groups such as ethylene oxide unit. Preferred among these hydrophilic groups is carboxylate Examples of the polyester polyol include polyesters obtained by the dehydration condensation reaction of a glycol component such as ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol (molecular weight: 300 to 6,000), dipropylene glycol, tripropylene glycol, bishydroxyethoxy benzene, 1,4-cyclohexanediol, 1,4-cyclohexanedimethanol, bisphenol A, hydrogenated bisphenol A, hydroquinone and alkylene oxide adduct thereof with an acid component such as succinic acid, adipic acid, azelaic acid, sebacic acid, dodecadicarboxylic acid, maleic anhydride, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p, p'-dicarboxylic acid, anhydride of these dicarboxylic acids, ester-forming derivative of these dicarboxylic acids, p-hydroxybenzoic acid, p-(2-hydroxyethoxy)benzoic acid and ester-forming derivative of these hydroxycarboxylic acids. Other examples of the polyester polyol employable herein include polyesters obtained by the ring-opening polymerization reaction of cyclic ester compounds such as ε-caprolactone, and copolymers thereof.

Examples of the polyether employable herein include those obtained by the addition polymerization of one or more monomers selected from the group consisting of ethylene oxide, propylene oxide, butylene oxide, styrene oxide, epichlorohydrin, tetrahydrofuran and cyclohexylene in the presence of one or more compound having at least two active hydrogen atoms per molecule selected from the group consisting of ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylol propane, sorbitol, cane sugar, aconitic acid, trimellitic acid, hemimellitic acid, phosphoric acid, ethylenediamine, diethylenetriamine, triisopropanolamine, pyrogallol, dihydroxybenzoic acid, hydroxyphthalic acid and 1,2,3-propanetrithiol as an initiator.

Examples of the polycarbonate polyol employable herein include compounds obtained by the reaction of a glycol such as 1,4-butanediol, 1,6-hexanediol and diethylene glycol with diphenyl carbonate and phosgene.

Examples of the polyisocyanate employable herein include 2,4-tolylenediisocyanate, 2,6-tolylenediisocyanate, m-phenylenediisocyanate, p-phenylenediisocyanate, 4,4'-diphenylmethanediisocyanate, 2,4'-diphenylmethane diisocyanate, 2,2'-diphenylmethanediisocyanate, 3,3'-dimethyl-4,4'-biphenylenediisocyanate, 3,3'-dimethoxy-4,4'-biphenylenediisocyanate, 3,3'-dichloro-4,4'-biphenylene diisocyanate, 1,5-naphthalenediisocyanate, 1,5-tetrahydro naphthalenediisocyanate, tetramethylenediisocyanate, 1,6-hexamethylenediisocyanate, dodecamethylenediisocyanate, trimethylhexamethylenediisocyanate, 1,3-cyclohexylene diisocyanate, 1,4-cyclohexylenediisocyanate, xylylene diisocyanate, tetramethylxylylenediisocyanate, hydrogenated xylylenediisocyanate, lysine diisocyanate, isophorone diisocyanate, 4,4'-dicyclohexylmethanediisocyanate, and 3,3'-dimethyl-4,4'-dicyclohexylmethanediisocyanate. These polyisocyanates may be used, singly or in admixture.

The water-dispersible polyurethane according to the present invention can be prepared from the foregoing starting materials by any known conventional method.

In some detail, the foregoing polyisocyanate and active hydrogen-containing compound (including a hydrophilic group-containing compound and a polydimethylsiloxane group-containing compound) may be reacted at a temperature of from 20° C. to 120° C., preferably from 30° C. to 100° C. in such an amount that the equivalence ratio of isocyanate group to active hydrogen group is from 0.8/1 to 1.2/1, preferably from 0.9/1 to 1.1/1. Such a reaction may be effected in an organic solvent. Such an organic solvent is not specifically limited. Any known organic solvents may be used. Preferred among these organic solvents is methyl ethyl ketone.

The perfluoroalkyl group-containing ethylenically unsaturated monomer of the present invention is not specifically limited. Any known conventional perfluoroalkyl group-containing ethylenically unsaturated monomers may be used.

Examples of the perfluoroalkyl group-containing ethylenically unsaturated monomer employable herein include perfluoroalkyl group-containing (meth)acrylates represented by the following general formula:

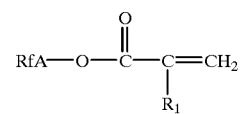

wherein Rf represents a $C_{4-20}$ perfluoroalkyl group; $R_1$ represents —H or —$CH_3$; and A represents —Q—, —CON($R_2$)—Q— or —$SO_2N(R_2)$—Q— (in which Q represents a $C_{1-10}$ alkylene group, and $R_2$ represents a $C_{1-4}$ alkyl group).

Specific examples of the perfluoroalkyl group-containing (meth)acrylate employable herein include the following compounds:

B-1: $CF_3(CF_2)_nCH_2CH_2OCOCH=CH_2$ (n=5 to 11, 9 on the average)
B-2: $CF_3(CF_2)_7CH_2CH_2OCOC(CH_3)=CH_2$
B-3: $CF_3(CF_2)_5CH_2CH_2OCOC(CH_3)=CH_2$
B-4: $(CF_3)_2CF(CF_2)_6(CH_2)_3OCOCH=CH_2$
B-5: $(CF_3)_2CF(CF_2)_{10}(CH_2)_3OCOCH=CH_2$
B-6: $CF_3(CF_2)_7SO_2N(C_3H_7)CH_2CH_2OCOCH=CH_2$
B-7: $CF_3(CF_2)_7SO_2N(CH_3)CH_2CH_2OCOC(CH_3)=CH_2$
B-8: $CF_3(CF_2)_7SO_2N(CH_3)CH_2CH_2OCOCH=CH_2$
B-9: $CF_3(CF_2)_7(CH_2)_4OCOCH=CH_2$
B-10: $CF_3(CF_2)_6COOCH=CH_2$
B-11: $CF_3(CF_2)_7SO_2N(C_4H_9)(CH_2)_4OCOCH=CH_2$
B-12: $CF_3(CF_2)_7CH_2CH(OH)CH_2OCOCH=CH_2$
B-13: $CF_3(CF_2)_5CON(C_3H_7)CH_2CH_2OCOC(CH_3)=CH_2$
B-14: $CF_3(CF_2)_7CON(C_2H_5)CH_2CH_2OCOCH=CH_2$ As the polydimethylsiloxane group-containing ethylenically unsaturated monomer there may be any compound having a polydimethylsiloxane group and an ethylenically unsaturated double bond in its molecule. For example, a reactive silicone oil represented by the following general formula (S-5) may be used.

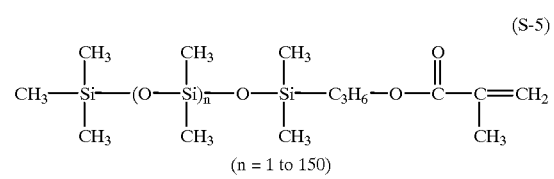

(n = 1 to 150)

Examples of the other copolymerizable ethylene monomers include monomers such as ethylene, propylene, vinyl chloride, vinylidene chloride, styrene, α-methylstyrene, vinyl acetate, methyl (meth)acrylate, ethyl (meth)acrylate, n-butyl (meth)acrylate, iso-butyl (meth)acrylate, tert-butyl (meth)acrylate, hexyl (meth)acrylate, n-octyl (meth)acrylate, 2-ethylhexyl (meth)acrylate, decyl (meth)acrylate, dodecyl (meth)acrylate, hexadecyl (meth)acrylate, stearyl (meth)acrylate, iso-stearyl (meth)acrylate, benzyl (meth)acrylate, cyclohexyl (meth)acrylate, isoboronyl (meth)acrylate, dicyclopentanyl (meth)acrylate, dicyclopentenyl (meth)acrylate, methyl vinyl ether, propyl vinyl ether, octyl vinyl ether, butadiene, isoprene, chloroprene, 2-hydroxyethyl (meth)acrylate, (meth)acrylic acid, (meth) acrylamide and 3-chloro-2-hydroxy (meth)acrylate.

As the other ethylenically unsaturated monomers there may be used crosslinkable ethylenically unsaturated monomers. Examples of the crosslinkable ethylenically unsaturated monomers employable herein include N-methylol (meth)acrylamide, glycidyl (meth)acrylate, diacetone acrylamide, and acetoacetyl group-containing ethylenically unsaturated monomer such as acetoacetoxy ethyl acrylate, acetoacetoxy ethyl methacrylate, acetoacetoxy ethyl chrotonate, acetoacetoxy propyl acrylate, acetoacetoxy propyl methacrylate, acetoacetoxy propyl chrotonate, 2-cyanoacetoacetoxy ethyl methacrylate, N-(2-acetoacetoxyethyl) acrylamide, N-(2-acetoacetoxyethyl) methacrylamide, allyl acetoacetate and vinyl acetoacetate. Further examples of the crosslinkable ethylenically unsaturated monomers employable herein include polyurethane acrylates having polyurethane as a main chain, and epoxy acrylates having an epoxy resin as a skeleton.

The amount of the perfluoroalkyl group-containing ethylenically unsaturated monomer to be used is not specifically limited but is preferably from 40 to 95 parts by weight based on 100 parts by weight of the total weight of the ethylenically unsaturated monomers. If the content of the perfluoroalkyl group-containing ethylenically unsaturated monomer falls below 40 parts by weight, the fluororesin cannot exert sufficient release strength. On the contrary, if the content of the perfluoroalkyl group-containing ethylenically unsaturated monomer exceeds 95 parts by weight, the result based on the perfluoroalkyl group is saturated. Thus, excess perfluoroalkyl group-containing ethylenically unsaturated monomer is wasted from the standpoint of production cost.

The amount of the dimethylsiloxane group-containing ethylenically unsaturated monomer to be used is not specifically limited but is preferably not more than 30 parts by weight based on 100 parts by weight of the total weight of the ethylenically unsaturated monomers. If the amount of the dimethylsiloxane group-containing ethylenically unsaturated monomer to be used exceeds 30 parts by weight, a stable aqueous resin dispersion can hardly be obtained to disadvantage.

If the perfluoroalkyl group-containing ethylenically unsaturated monomer and the polydimethylsiloxane group-containing ethylenically unsaturated monomer are used in combination, the amount of the two monomers to be used are not specifically limited. Preferably, the content of the perfluoroalkyl group-containing monomer and the polydimethylsiloxane group-containing ethylenically unsaturated monomer are from 5 to 70 parts by weight and not more than 30 parts by weight, respectively, based on 100 parts by weight of the total weight of the ethylenically unsaturated monomers. The combined use of the perfluoroalkyl group-containing ethylenically unsaturated monomer and the polydimethylsiloxane group-containing ethylenically unsaturated monomer makes it possible to reduce the required amount of the two monomers while maintaining the expected effect of the present invention and thus is favorable for the reduction of production cost. If the content of the perfluoroalkyl group-containing ethylenically unsaturated monomer falls below 5 parts by weight, the fluororesin cannot exert a sufficient releasing effect. On the contrary, if the content of the perfluoroalkyl group-containing ethylenically unsaturated monomer exceeds 70 parts by weight, the resulting fluorine effect is saturated. Thus, excess perfluoroalkyl group-containing ethylenically unsaturated monomer is wasted from the standpoint of production cost. If the content of the polydimethylsiloxane group-containing ethylenically unsaturated monomer exceeds 30 parts by weight, a stable emulsion cannot be obtained as in the foregoing case of single use. This is unfavorable for the reduction of the production cost.

In the present invention, the weight ratio of the water-dispersible polyurethane to the copolymer obtained by the reaction of a perfluoroalkyl group-containing ethylenically unsaturated monomer and/or dimethylpolysiloxane group-containing ethylenically unsaturated monomer with another ethylenically unsaturated monomer copolymerizable therewith is preferably from 9/1 to 4/6. If the weight ratio of the water-dispersible polyurethane exceeds 9/1, the resulting aqueous resin dispersion cannot sufficiently exert the effect of vinyl polymer.

The process for the preparation of the aqueous dispersion of a perfluoroalkyl group and a polydimethylsiloxane group-containing resin of the present invention is not specifically limited. Examples of the process for the preparation of the aqueous resin dispersion include (i) a process which comprises adding a part or whole of a mixture of ethylenically unsaturated monomers dropwise to an aqueous medium having a water-dispersible polyurethane containing a polydimethylsiloxane group and a hydrophilic group dispersed therein so that it undergoes polymerization in the presence of a polymerization initiation source, (ii) a process which comprises dispersing a mixture of ethylenically unsaturated monomers in water in the presence of an aqueous dispersion of a water-dispersible polyurethane containing silicone and a hydrophilic group by means of an agitator or mixer having a high shearing force such as homogenizer, microfluidizer and nanomixer available from Manton Gaulin Manufacturing Corp. and polymerizing the mixture in the presence of a polymerization initiation source, (iii) a process which comprises preparing in an organic solvent a mixture of a polymer of ethylenically unsaturated monomers prepared in an organic solvent and a water-dispersible polyurethane containing a polydimethylsiloxane group and a hydrophilic group, neutralizing the hydrophilic group in the polyurethane, and then subjecting the reaction mixture to phase inversion emulsification to effect aqueous dispersion, (iv) a process which comprises preparing in an organic solvent a mixture of ethylenically unsaturated monomers and a mixture of water-dispersible polyurethanes containing a polydimethylsiloxane group and a hydrophilic group, polymerizing these mixtures in the presence of a polymerization initiation source, neutralizing the hydrophilic group in the polyurethanes, and then subjecting the reaction mixture to phase inversion emulsification to effect aqueous dispersion, and (v) a process which comprises preparing in an organic solvent a mixture of ethylenically unsaturated monomers and a mixture of water-dispersible polyurethanes containing a polydimethylsiloxane group and a hydrophilic group, neutralizing the hydrophilic group in the polyurethanes, subjecting the reaction mixture to phase inversion emulsification to effect aqueous dispersion, and then polymerizing these mixtures in the presence of a polymerization initiation source.

Particularly preferred among these preparation processes is the process (v) which comprises preparing in an organic solvent a mixture of ethylenically unsaturated monomers and a mixture of water-dispersible polyurethanes containing a polydimethylsiloxane group and a hydrophilic group, neutralizing the hydrophilic group in the polyurethanes, subjecting the reaction mixture to phase inversion emulsification to effect aqueous dispersion, and then polymerizing these mixtures in the presence of a polymerization initiation source. This process provides a stable aqueous dispersion.

Examples of the neutralizing agent to be used in the neutralization of the hydrophilic group in the water-dispersible polyurethane containing a polydimethylsiloxane group and a hydrophilic group include volatile bases such as ammonia, tertiary amines such as trimethylamine, triethylamine, dimethyl ethanolamine, methyldiethanolamine and triethanolamine, and nonvolatile bases such as sodium hydroxide and potassium hydroxide. Particularly preferred among these neutralizing agents is ammonia.

Prior to the formation of an aqueous dispersion of a mixture of polyurethane and monomer, the neutralizing agent is added to the mixture in an amount enough to render the polyurethane water-dispersible, i.e., an amount enough to substantially neutralize the hydrophilic group in the polyurethane as well known in the art. In some detail, the neutralizing agent is added in an amount of from about 65 to 100% of equivalent of the hydrophilic group. The neutralizing agent is preferably added until the hydrophilic group is neutralized by 80% or more.

The mixture of polyurethane and monomer can be dispersed in water by phase inversion emulsification method.

The phase inversion emulsification can be accomplished by any well known method. In some detail, water may be added dropwise or batchwise to the mixture of polyurethane and monomer with stirring. In order to obtain an aqueous dispersion having a high stability, the batchwise addition of water is preferred. In this case, the amount of water to be added per batch is preferably from 1/30 to 1/5 of the total weight of the water to be added. Once the water thus added has been homogeneously mixed with the mixture of polyurethane and monomer, the subsequent addition of water may be conducted.

The polymerization initiation source employable herein is not specifically limited. For example, various polymerization initiators such as azo compound and organic peroxide may be used. Alternatively, ultraviolet rays or ionizing radiations such as γ-rays may be used.

The radical polymerization of the mixture of polyurethane and monomer is effected at a temperature high enough to dissociate free radicals. In this case, the polymerization is preferably effected at a temperature of from 50° C. to 80° C., more preferably from 60° C. to 75° C.

The aqueous resin dispersion of the present invention thus obtained can be used as an release agent for pressure sensitive adhesive or release coat for back face of pressure sensitive adhesive tape.

The present invention will be further described in the following examples and comparative examples. The units "parts" and "%" are by weight unless otherwise specified. The monomers used in these examples and comparative examples will be called as in the foregoing detailed description.

EXAMPLE 1

In a four-necked flask equipped with a thermometer, an agitator and a reflux condenser were charged 200 parts of a polyester (OH value: 91) obtained by the reaction of ethylene glycol, neopentyl glycol, terephthalic acid, isophthalic acid and adipic acid. In the flask were then charged 26 parts of Silicone S-1 and 170 parts of methyl ethyl ketone. The reaction mixture was thoroughly stirred. To the reaction mixture were then added 54 parts of hexamethylene diisocyanate. The reaction mixture was heated to a temperature of 75° C. where it was then reacted for 3 hours. Subsequently, the solution was cooled to a temperature of 55° C. To the solution were then added 16 parts of dimethylolpropionic acid. The reaction mixture was then reacted for 15 hours to obtain a water-dispersible polyurethane solution. A monomer mixture of 183 parts of a perfluoroalkyl group-containing ethylenically unsaturated monomer B-1, 39 parts of methyl methacrylate, 8 parts of 2-hydroxyethyl methacrylate, 26 parts of a polydimethylsiloxane group-containing ethylenically unsaturated monomer S-5, 5 parts of N-methylolacrylamide and 2.6 parts of lauryl mercaptan was then dissolved in 130 parts of methyl ethyl ketone. The solution was then added to the foregoing polyurethane solution to make a solution. To the solution thus obtained were then added 40 parts of a 5% aqueous solution of ammonia. The mixture was kept at a temperature of 55° C. for 0.5 hours. To the mixture were then added batchwise 1,500 parts of water by 20 parts in 1 hour to obtain a homogeneous water dispersion. The water dispersion thus obtained was heated to a temperature of 70° C. where 1.5 parts of ammonium persulfate were then added thereto with stirring. Under these conditions, the reaction mixture was allowed to undergo polymerization reaction for 6 hours. The resulting aqueous dispersion was transferred into an eggplant type flask where it was then desolvated at a temperature of 55° C. and a pressure of 360 mmHg by means of a rotary evaporator to obtain 2,120 parts of a stable aqueous dispersion (A) having a solid content of 25%.

EXAMPLES 2 TO 7; COMPARATIVE EXAMPLES 1 TO 3

The procedure of Example 1 was followed except that the kind and amount of silicone in the polyurethane and the kind and amount of perfluoroalkyl group-containing ethylenically unsaturated monomer and/or polyorganosiloxane group-containing ethylenically unsaturated monomer in the monomers were changed as set forth in Table 1 to synthesize aqueous dispersions. Thus, stable aqueous dispersions (B) to (J) having a solid content of 25% were obtained.

COMPARATIVE EXAMPLE 4

2.57 parts of an anionic surface active agent K-1, 12.85 parts of a nonionic surface active agent K-2 and 882 parts of water were mixed in a first beaker where the mixture was then heated to a temperature of 50° C. 183 parts of a perfluoroalkyl group-containing ethylenically unsaturated monomer B-1, 26 parts of a polydimethylsiloxane group-containing ethylenically unsaturated monomer S-5, 39 parts of methyl methacrylate, 8 parts of 2-hydroxyethyl methacrylate, 5 parts of N-methylolacrylamide, 2.6 parts of lauryl mercaptan and 130 parts of acetone were mixed in a second beaker where the mixture was then heated to a temperature of 50° C. The mixture in the first beaker was poured into the second beaker where the two mixtures were then subjected to homogeneous dispersion. The dispersion was then emulsified at a pressure of 400 kgf/cm² by means of a homogenizer available from Manton Gaulin Manufacturing Corp. to obtain a monomer emulsion. The monomer emulsion thus obtained was transferred into a four-necked flask equipped with a thermometer, an agitator and a reflux condenser in which the air within had been replaced by nitrogen. The reaction mixture was heated to a temperature of 70° C. where 0.21 part of ammonium persulfate were then added thereto with stirring. Under these conditions, the reaction mixture was allowed to undergo polymerization reaction for 6 hours. The resulting aqueous dispersion was transferred into an eggplant type flask where it was then desolvated at a temperature of 55° C. and a pressure of 360 mmHg by means of a rotary evaporator to obtain 1,155 parts of a stable aqueous dispersion (K) having a solid content of 20%.

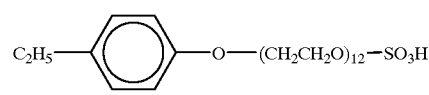

K-1

-continued

K-2

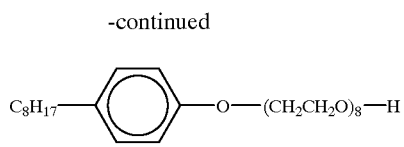

in the table that the variation of the amount of the perfluoroalkyl group-containing ethylenically unsaturated monomer and/or polydimethylsiloxane group-containing ethylenically unsaturated monomer and the kind and amount of the silicon in the hydrophilic group-containing water-dispersible polyurethane makes it possible to prepare release agents having releasability ranging from low releasability to high releasability with a low silicone content. It was also

TABLE 1

|  | Example | | | | | | | Comparative Example | | | |
| --- | --- | --- | --- | --- | --- | --- | --- | --- | --- | --- | --- |
|  | 1 | 2 | 3 | 4 | 5 | 6 | 7 | 1 | 2 | 3 | 4 |
| Aqueous dispersion | A | B | C | D | E | F | G | H | I | J | K |
| Urethane/acryl | 5/5 | 7/3 | 5/5 | 5/5 | 5/5 | 5/5 | 5/5 | 5/5 | 5/5 | * | ** |
| Starting material of urethane | | | | | | | | | | | |
| Polyester polyol | 200 | 200 | 200 | 200 | 200 | 200 | 200 | 200 | 200 | 200 | 0 |
| S-1 (n = 10) | 26 | 26 | 26 | 26 | | | | 350 | 26 | 26 | |
| S-1 (n = 54) | | | | | 26 | | | | | | |
| S-2 (n = 63) | | | | | | 57 | | | | | |
| S-3 (n = 64) | | | | | | | 25 | | | | |
| S-1, 2, 3/urethane [wt %] | 10 | 10 | 10 | 10 | 10 | 20 | 10 | 10 | 50 | 10 | 0 |
| Hexamethylene diisocyanate | 54 | 54 | 54 | 53 | 51 | 51 | 47 | 116 | 54 | 54 | 0 |
| 2,2-Dimethylolpropionic acid | 16 | 16 | 16 | 16 | 16 | 17 | 15 | 42 | 16 | 16 | 0 |
| Starting material of acryl | | | | | | | | | | | |
| B-1 | 183 | 79 | 230 | 0 | 179 | 257 | 172 | 176 | 0 | 0 | 179 |
| B-1/monomer [wt %] | 70 | 70 | 90 | 0 | 70 | 70 | 70 | 70 | 0 | 0 | 90 |
| S-5 (n = 64) | 26 | 11 | 0 | 26 | 26 | 0 | 25 | 26 | 104.4 | 0 | 26 |
| S-5/monomer [wt %] | 10 | 10 | 0 | 10 | 10 | 0 | 10 | 10 | 40 | 0 | 10 |
| Methyl methacrylate | 39 | 17 | 13 | 218 | 39 | 14 | 37 | 39 | 144 | 0 | 39 |
| 2-Hydroxyethyl methacrylate | 8 | 3 | 8 | 8 | 8 | 9 | 8 | 8 | 8 | 0 | 8 |
| N-methylolacrylamide | 5 | 2 | 5 | 5 | 5 | 6 | 5 | 5 | 5 | 0 | 5 |

*: urethane component only,
**: acryl component only

APPLICATION EXAMPLE 10 parts of each of the aqueous dispersions (A) to (G) were diluted with 15 parts of water. The coating solutions were each applied to a PET film by means of a bar coater (No. 8), and then dried at a temperature of 120° C. for 5 minutes. A 25 mm wide rubber pressure sensitive adhesive tape (available from Nitto Denko Corporation) was then applied to the coated material. A 2 kg roller was then rolled over the laminate on the rubber adhesive tape back and forth at a rate of 300 mm per minute so that the adhesive tape was applied to the coated material. Using a tensile tester, the peel strength at 180° angle with respect to the substrate was measured. The results are set forth in Table 2. It can be seen found that the adhesivity of these adhesive tapes can be kept to not less than 95% of the original value.

COMPARATIVE APPLICATION EXAMPLE

The aqueous dispersions (H) to (K) were each applied to a PET film by means of a bar coater (No. 8), and then dried at a temperature of 120° C. for 5 minutes in the same manner as in Example 1. Using a tensile testing machine, the peel strength of the 25 mm wide rubber pressure sensitive adhesive tape (available from Nitto Denko Corporation) at 180° angle with respect to the substrate was measured. The results are set forth in Table 2.

TABLE 2

| Example No. | Aqueous dispersion | Peel strength at 180° angle shortly after application (gf/2.5 cm) | Peel strength at 180° angle after 24 hours of ageing at 50° C.-95% RH (gf/2.5 cm) | Adhesion of the tape to the SUS panel after 24 hours of aging at 50° C.-95% RH (gf/2.5 cm) |
| --- | --- | --- | --- | --- |
| Application Examples | A | 15 | 30 | 680 |
| | B | 30 | 50 | 695 |
| | C | 90 | 110 | 675 |
| | D | 42 | 60 | 680 |
| | E | 8 | 15 | 690 |
| | F | 45 | 70 | 680 |
| | G | 10 | 25 | 660 |

TABLE 2-continued

| Example No. | Aqueous dispersion | Peel strength at 180° angle shortly after application (gf/2.5 cm) | Peel strength at 180° angle after 24 hours of ageing at 50° C.-95% RH (gf/2.5 cm) | Adhesion of the tape to the SUS panel after 24 hours of aging at 50° C.-95% RH (gf/2.5 cm) |
|---|---|---|---|---|
| Comparative Application Examples | H | 5 | 26 | 420 |
| | I | 11 | 32 | 390 |
| | J | 120 | 130 | 670 |
| | K | 11 | releasecoat transfer | |
| Uncoated substrate | | 710 | | 705 |

The use of the aqueous resin dispersion of the present invention makes it possible to freely control the peel strength of adhesive tape with respect to the coated substrate. Further, the aqueous resin dispersion of the present invention is excellent in the adhesivity to the substrate. Moreover, the aqueous resin dispersion of the present invention migrates little to the back face of the coating film. Further, the aqueous resin dispersion of the present invention undergoes little change of releasability with time. Thus, the aqueous resin dispersion of the present invention can be used as a release agent.

While the invention has been described in detail and with reference to specific embodiments thereof, it will be apparent to one skilled in the art that various changes and modifications can be made therein without departing from the spirit and scope thereof.

What is claimed is:

1. A releasing agent comprising an aqueous dispersion of a resin having a structure in which a vinyl copolymer is covered with a polyurethane, the resin prepared from (a) a vinyl copolymer which is prepared from a perfluoroalkyl group-containing ethylenically unsaturated monomer and/or polydimethylsiloxane group-containing ethylenically unsaturated monomer and another ethylenically unsaturated monomer copolymerizable therewith and (b) a water-dispersible polyurethane containing in combination a polydimethylsiloxane group and a hydrophilic group, where said aqueous dispersion of the resin is obtained by dispersing the copolymer (a) in water in the presence of the water-dispersible polyurethane (b).

2. A releasing agent comprising an aqueous dispersion according to claim 1, wherein the hydrophilic group in said water-dispersible polyurethane is a carboxylate group.

3. A releasing agent comprising an aqueous dispersion according to claim 1, wherein the content of said perfluoroalkyl group-containing ethylenically unsaturated monomer is from 40 to 95 parts by weight based on 100 parts by weight of the total weight of the ethylenically unsaturated monomers.

4. A releasing agent comprising an aqueous dispersion according to claim 1, wherein the content of said polydimethylsiloxane group-containing ethylenically unsaturated monomer is not more than 30 parts by weight based on 100 parts by weight of the total weight of the ethylenically unsaturated monomers.

5. A releasing agent comprising an aqueous dispersion according to claim 1, wherein the content of said perfluoroalkyl group-containing monomer is from 5 to 70 parts by weight based on 100 parts by weight of the total weight of the ethylenically unsaturated monomers and the content of said polydimethylsiloxane group-containing ethylenically unsaturated monomer is not more than 30 parts by weight based on 100 parts by weight of the total weight of the ethylenically unsaturated monomers.

6. A releasing agent comprising an aqueous dispersion according to claim 1, wherein the weight ratio of said copolymer to said water-dispersible polyurethane is from 1/9 to 6/4.

7. A process for the preparation of a release agent comprising an aqueous dispersion of a resin having a structure in which a vinyl copolymer is covered with a polyurethane, which comprises the steps of:

adding a neutralizing agent to a solution of a mixture of a perfluoroalkyl group-containing ethylenically unsaturated monomer and/or polydimethylsiloxane group-containing ethylenically unsaturated monomer, another ethylenically unsaturated monomer copolymerizable therewith and a water-dispersible polyurethane containing in combination a polydimethylsiloxane group and a hydrophilic group in an organic solvent;

adding water to the reaction mixture so that it undergoes phase inversion emulsification to prepare an aqueous dispersion of said water dispersible polyurethane and said ethylenically-unsaturated monomer; and then allowing the aqueous dispersion to under polymerization in the presence of a polymerization initiating source.

8. The preparation process according to claim 7, wherein said water-dispersible polyurethane containing a polydimethylsiloxane group and a hydrophilic group is obtained by the reaction of a polydimethylsiloxane group having one or more hydroxyl groups, a hydrophilic group-containing diol, a polyol other than said diol and a polyisocyanate compound.

9. The preparation process according to claim 7, wherein the hydrophilic group in said water-dispersible polyurethane is a carboxylate group.

10. The preparation process according to claim 8, wherein the hydrophilic group in said water-dispersible polyurethane is a carboxylate group.

11. A releasing agent comprising an aqueous dispersion according to claim 2, wherein the content of said perfluoroalkyl group-containing ethylenically unsaturated monomer is from 40 to 95 parts by weight based on 100 parts by weight of the total weight of the ethylenically unsaturated monomers.

12. A releasing agent comprising an aqueous dispersion according to claim 2, wherein the content of said polydimethylsiloxane group-containing ethylenically unsaturated monomer is not more than 30 parts by weight based on 100 parts by weight of the total weight of the ethylenically unsaturated monomers.

13. A releasing agent comprising an aqueous dispersion according to claim 2, wherein the content of said perfluoroalkyl group-containing monomer is from 5 to 70 parts by weight based on 100 parts by weight of the total weight of the ethylenically unsaturated monomers and the content of said polydimethylsiloxane group-containing ethylenically unsaturated monomer is not more than 30 parts by weight based on 100 parts by weight of the total weight of the ethylenically unsaturated monomers.

14. A releasing agent comprising an aqueous dispersion according to claim 2, wherein the weight ratio of said copolymer to said water-dispersible polyurethane is from 1/9 to 6/4.

* * * * *